United States Patent
Kim et al.

(10) Patent No.: US 6,822,021 B1
(45) Date of Patent: Nov. 23, 2004

(54) SILICONE AQUEOUS EMULSION RELEASE LIQUID AND RELEASE FILM USING THE SAME

(75) Inventors: Sang Pil Kim, Kyungsangbuk-do (KR); Ki Bong Suh, Kyungsangbuk-do (KR); Moon Bok Lee, Kyungsangbuk-do (KR); Jeong Woo Lee, Kyungsangbuk-do (KR); Kwang Choon Chung, Seoul (KR); Myung Sun Gong, Seoul (KR); Chang Soo Kim, Kyungsangnam-do (KR)

(73) Assignees: Toray Saehan Incorporation, Kyongsangbuk-do (KR); Haeun Chemtec Co., Ltd., Kyunggi-do (KR)

( * ) Notice: Subject to any disclaimer, the term of this patent is extended or adjusted under 35 U.S.C. 154(b) by 14 days.

(21) Appl. No.: 10/320,359

(22) Filed: Dec. 16, 2002

(51) Int. Cl.$^7$ ................................. C08K 9/06
(52) U.S. Cl. ................ 523/216; 523/212; 524/403; 524/588; 428/447
(58) Field of Search ................ 524/403, 588; 523/212, 216; 428/447, 480, 483; 528/15, 31, 32

(56) References Cited

U.S. PATENT DOCUMENTS 6,071,987 A  *  6/2000  Matsumoto et al. ........ 523/209

* cited by examiner

*Primary Examiner*—David J. Buttner
*Assistant Examiner*—Christopher Keehan
(74) *Attorney, Agent, or Firm*—Harrison & Egbert

(57) ABSTRACT

A release agent and a release liquid which are used for the manufacture of labels, double-sided tapes, etc., are disclosed. The release agent and the release liquid provide improved adhesion between a substrate and a release layer, and excellent peel strength betwveen the release layer and an adherent. The release agent includes a dispersion of a vinyl-modified colloidal silica, a dispersion of a platinum chelate catalyst, and a polysiloxane water-dispersible silicone emulsion. The release liquid is obtained by dispersing the release agent in water so as to have a solid content of 2.5~30% by weight. The release film is produced by applying the release liquid on a substrate, followed by drying.

6 Claims, 1 Drawing Sheet

SILICONE AQUEOUS EMULSION RELEASE LIQUID AND RELEASE FILM USING THE SAME

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a release agent and a release liquid which are used for the manufacture of adhesive labels, peel-offlabel stickers, double- sided tapes, etc., and to a release film using the release liquid. In particular, the present invention relates to a release liquid obtained by dispersing a mixture of an aqueous emulsion silicone release agent and a modified colloidal silica in water, and a release film using the release liquid as a release layer. The release film according to the present invention has greatly improved adhesive strength between a substrate and the release layer and excellent peel strength between the release layer and an adherent.

BACKGROUND OF THE INVENTION

In general, as shown in FIG. 1, a release film is produced by applying a release liquid as a release layer 2 on a substrate 1 such as a plastic film, a sheet, a paper or a non-woven fabric at a predetermined thickness. For example, U.S. Pat. Nos. 5,672,428 and 5,728,339 disclose a release layer obtained by forming a plastic film or sheet as a substrate, followed by applying a release agent thereon.

However, conventional release films usingthe release layerhave disadvantagesofinadequate peel strength and adhesive strength. That is, a peel strength sufficient to release a release film from an adherent after the release film is contacted with the adherent results in weak adhesive strength between the substrate and the release agent. In addition, the release film causes problems such as peeling off of the release agent from the substrate and poor solvent resistance.

There have been known a number ofinethods for improving the adhesion between a substrate and a release agent. For example, when a plastic film is used as the substrate, the surface of the plastic film is chemically treated with chromic acid, ozone, corona, flame, radioactive ion beam, etc. In particular, when the plastic film is a polyester film, the surface of the plastic film is treated with a highly polar polymer such as modified polyester having a high affinity, a partially hydrolyzed ethylene-vinyl acetate copolymer, polyvinylbutyral, etc.

In addition, methods for improving the peel strength between a release layer and an adherent, and the adhesion between a substrate and the release layer have been known. For example, U.S. Pat. No. 5,298,325 suggests a method for forming a release layer by forming a primer layer on a substrate, followed by off-line coating on the primer layer. However, the patent has problems in terms of complex processes including the off-line coating, and increased manufacturing cost.

In common release films, increasing of the adhesive strength between a release layer and a substrate results in low peel strength, and increasing of peel strength to improve the releasability results in low adhesive strength between the release layer and the substrate.

According to U.S. Pat. Nos. 5,672,428 and 5,728,339, a release film is produced by in-line coating a plastic substrate once with a silicone aqueous emulsion release agent. At this time, an adhesion promoter is added to the release agent to improve adhesion between the film and the release agent. Examples of the adhesion promoter used herein include water-dispersible polyester, water-dispersible acrylic resin, glycidoxyalkoxysilane, etc.

On the other hand, a stretching operation must be performed during the in-line coating of the plastic film with the release agent. At this time, the operation requires considerable care so as not to cause poor adhesion between the release agent and the substrate, and smoothness of the release layer. When in-line coating the plastic substrate with the release agent, poor smoothness of the release layer results from irregular contraction and expansion of the release layer during stretching or annealing operation following coating the release agent, or from partial crosslinking caused by different cross-linking rates due to non-uniform heat transfer between the release layer and the substrate.

BRIEF SUMMARY OF THE INVENTION

Therefore, the present invention has been made in view of the above problems, and it is an object of the present invention to provide a release film having an excellent adhesive strength between a substrate and a release agent, and having excellent peel strength between the release film and an adherent.

It is another object of the present invention to provide a simplified manufacturing process of the release film by using a silicone aqueous emulsion release agent containing a vinyl-modified colloidal silica, instead of a release agent containing an organic solvent, thereby causing no volatilization of organic solvent during producing the release film, and forming the release layer by in-line coating.

In accordance with the present invention, there is provided a silicone aqueous emulsion release agent comprising:
- 1~10% by weight of a dispersion of a vinyl-modified colloidal silica having a solid content of 10~40% by weight;
- 0.1~5% by weight of a dispersion of aplatinum chelate catalyst having a solid content of 12~25% by weight; and
- the remaining amount of a polysiloxane water-dispersible silicone emulsion having a solid content of 30~60% by weight.

In accordance with the present invention, there is provided a silicone aqueous emulsion release liquid obtained by dispersing the silicone aqueous emulsion release agent in water so as to have a solid content of 2.5~30% by weight.

In accordance with the present invention, there is provided a release film produced by applying the silicone aqueous emulsion release liquid on a substrate.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawing.

DETAILED DESCRIPTION OF THE INVENTION

Figure 1:
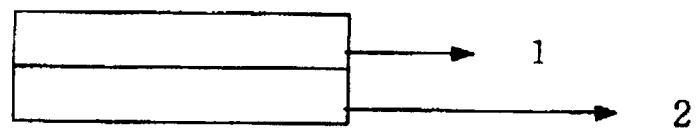
FIG. 1 is a cross-sectional view schematically showing a common release film.

Hereinafter, the present invention will be explained more detail.

The dispersion of a modified colloidal silica used in the present invention is obtained by reacting 10~30% by weight of a colloidal silica with an alkoxysilane compound or polymer having a vinyl group and, at the same time, dispersing the reaction mixture in water. The vinyl-modified colloidal silica used has a polar hydroxyl group capable of increasing binding strength with a substrate at the center of the silica core, and a vinyl group capable of chemically binding with the polarhydroxyl group. However, the vinyl-modified colloidal silicamust not decrease the releasability of a release agent. The vinyl-modified colloidal silica is obtained by the reaction of a colloidal silica and vinylalkoxysilane. At this time, the vinylalkoxysilane undergoes hydrolysis and condensation with a hydroxyl group on the surface of the colloidal silica to obtain the vinylmodified colloidal silica having a vinyl group. In addition, aminotrialkoxysilane having an amino group is hydrolyzed and reacted with carboxylic acid containing an amino group and a vinyl group on the surface of the silica to obtain the vinyl-modified colloidal silica having a vinyl group. Furthermore, an organic silane polymer having amine groups is directly reacted with a colloidal silica and further reacted with a carboxyl compound having a vinyl group to obtain the vinyl-modified colloidal silica.

The organic silane compound having a vinyl group which can react with a colloidal silica to obtain the vinyl-modified colloidal silica, is selected from the group consisting of vinyltrimethoxysilane, vinyltriethoxysilane, allyltrimethoxy-silane, allyltriethoxysilane, 3-(trimethoxysilyl)propyl acrylate, 3-(trimethoxysilyl) propyl methacrylate, 3-(triethoxysilyl)propyl acrylate, 3-(triethoxysilyl)propyl methacrylate, N-[3-(trimethoxysilyl)propyl]-N'-(4-vinylbenzyl) ethylenediaminehydrochloride and mixtures thereof.

The organic silane compound having an amine group which can react with a colloidal silica to obtain the vinyl-modified colloidal silica, is selected from the group consisting of γ-aminopropyltrimethoxysilane, γ-aminopropyltriethoxysilane, γ-aminopropylmethyldimethoxysilane, γ-aminopropyldimethylethoxysilane, N-phenyl-γ-aminopropyltrimethoxysilane, N-phenyl-γ-aminopropyltriethoxysilane, N-β-(aminoethyly-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropyldimethylethoxysilane, N'- [3-(trimethoxysilyl) propyl]diethylenetriamine, N-[4-(trimethoxysilyl)butyl] ethylenediamine and mixtures thereof.

Examples of vinyl monomer having a carboxyl group which can react with the amine-modified colloidal silica to obtain the vinyl-modified colloidal silica includeacrylic derivatives and methacrylic acid derivatives, etc., and the vinyl monomer is preferably selected from the group consisting of acrylic acid, methacrylic acid, itaconic acid, vinylacetic acid, vinylpropionic acid and mixtures thereof.

Examplesofcondensation polymerhavingorganicsilane groupsto obtain thevinyl-modified colloidal silica include N-[3-(trinmethoxysilyl)propyl] polyethyleneiminehydrochloride, N-[3-(trimethoxysi lyl) propyl] polyethyleneimine, etc.

The particle size of the vinyl-modified colloidal silica used in the present invention is preferably within the range of from 1 nm to 500 nm, and more preferably within the range of from 1 nm to 100 nm. In addition, the solid content ofthc vinyl-modified colloidal silica is preferably within the range of 1~10% by weight, based on the weight of the release liquid. When the solid content is less than 1% by weight, binding strength with the substrate is insufficient. When the solid content is more than 10% by weight, the degree of cross-linking and dispersibility are poor, and smoothness of the release layer is deteriorated.

The platinum chelate catalyst used in the present invention has a solid content of 12~25% by weight in a water-dispersible solution, and is included in an amount of 0.1~5% by weight within the release agent. Examples of the platinum chelate catalyst include carbon-supported platinum or silica-supported platinum, chloroplatinate, platinum-olefin complexes, platinum-alcohol complexes, platinum-amine complexes, platinum coordination compounds, etc. Using less than 0.1% by weight of the platinum chelate catalyst causes contamination due to slow curing during the coating step, while using more than 5% by weight does not significantly increase the curing rate, and is thus economically disadvantageous.

The polysiloxane water-dispersible emulsion release agent comprises 30~40% by weight of a vinylpolysiloxane resin, 1~10% by weight of a hydropolysiloxane resin, 0.1~5% by weight of a non-ionic surfactant and the remaining amount of water. The solid content of the polysiloxane watcr-dispersible emulsion release agent is preferably within the range of 30~60% by weight. The average particlesize of the polysiloxane water-dispersible emulsion release agent is preferably within the range of 0.01~1 μm.

Vinyl groups included in the vinylpolysiloxane resin may be bonded to any positions within the resin molecule, and preferably may be bonded to the end portions of the molecule. In addition, the molecule may be a linear or branched structure, ora combination thereof. Instead ofinethyl group, hydrocarbons having 1 to 20 carbon atoms which are unsubstituted or substituted may be bound to the silicon atom. Examples of these hydrocarbons include alkyl groups such as ethyl group, propyl group, butyl group, hexyl group, dodecyl group, tetradecyl group, hexadecyl group, octadecyl group, etc.; aryl groups such as phenyl group, tolyl group, etc.; and -phenylethyl group, -phenylhydrocarbon group, chloromethyl group, 3,3,3-trifluoropropyl group, etc. However, the content of methyl group must be not less than 70 mol % and more preferably not less than 80 mol % in terms of better smoothness and releasability. When the content of methyl group is less than 70 mol %, smoothness and releasability are poor. The viscosity of the vinylpolysiloxane is, but is not particularly limited to, within the range of from 10 to 10,000 cSt at 25° C., and preferably within the range of form 1000 to 5,000 cSt. When the viscosity is less than 10cSt, curing is difficult. When the viscosity is more than 10,000 cSt, surface smoothness is poor.

The hydropolysiloxane resin used as a curing agent in the present invention may be a linear, branched, cyclic structure, or a combination thereof, but is limited to these structures. The viscosity and molecular weight of the hydropolysiloxane resin are not limited, so long as the hydropolysiloxane resinlhas agood compatibility with thevinylpolysiloxane resin. The amount of the hydropolysiloxane resin used is determined so that the number of hydrogen atoms bound to one silicon atom per one vinyl group of the vinylpolysiloxane resin is preferably within the range of 0.5~1. When the number of hydrogen atoms bound to one silicon atom per one vinyl group is less than 0.5, it is difficult to obtain a good curability. When the number of hydrogen atoms bound to one silicon atom per one vinyl group is more than 5, elasticity and physical properties after curing are poor.

When hydropolysiloxane is used in an amount exceeding the amount of vinylpolysiloxane, crosslinking is progressed to decrease the flexibility, thereby causing cracks on the membrane and thus decreasing smoothness.

Examples of the non-ionic surfactant used in the present invention include polyoxyethylene alkylether, polyoxypropylene alkylether, polyoxyethylene alkylphenylether, polyethyleneglycol fatty acid esters, sorbitan fatty acid esters, polyoxyethylene sorbitan fatty acid esters, glycerin fatty acid esters, polyoxyethyleneglycerin fatty acid esters, polyglycerin fatty acid esters, propyleneglycol fatty acid esters, and mixtures thereof. Polyoxyethylene alkylether and polyoxyethylene alkylphenylether are preferable.

The average particle diameter of the colloidal silica and spherical silicone resin contained in the silicone aqueous emulsion release agent and the release liquid are preferably within the range of 0.001~100 μm. It is very difficult to obtain the colloidal silica and spherical silicone resin having an average particle diameter smaller than 0.001 μm. When the average particle diameter is larger than 100 μm, stability of emulsion and surface smoothness are unsatisfactory.

The silicone aqueous emulsion release liquid according to thepresent invention can beapplied on plastic films such as polyester, polypropylene, polyethylene, polyvinylchloride, nylon, etc., kraft papers, non-woven fabrics, clothes, etc. The release liquid according to the present invention preferably has a solid content of 2.5~20% by weight.

After the substrate is surface-treated by corona, to strengthen the chemical bonding between the release layer, its surface is applied agent. The thickness of the substrate is the range of. 20~1500 μm. In addition, in order to fully strengthen the chemical bonding between the release layer, a chemically treated layer such as a primer layer can be previously formed between the substrate and the release layer. Fhe thickness of the release layer is preferably thinner than 5 μm, and more preferably thinner than 3 μm.

Hereinafter, the present invention will be described in more detail with reference to the following Examples. However, these examples are given for the purpose of illustration and not of limitation.

[Preparative Example 1]

10 parts by weight of allyltrimethoxysilane was added dropwise to 100 parts by weight of a colloidal silica (silica solid content: 30% by weight, average particle size: 7 nm) with vigorous stirring at room temperature over 1 hour, and then the mixture was maintained for 2 hours. Thereafter, the mixture was raised to 80° C., and further reacted for 6 hours to obtain a vinyl-modified colloidal silica.

[Preparative Example 2]

100 parts by weight of a colloidal silica (silica solid content: 30% by weight, average particle size: 7 nm) was charged into a three-neck flask equipped with a nitrogen inlet, a stirrer and a thermometer under nitrogen atmosphere, and then 5 parts by weight of -aminopropyltrimethoxysilane was added dropwise thereto with vigorous stirring, and the mixture was maintained for 2 hours. Thereafter, the mixture was raised to 80° C., and then maintained for 6 hours to obtain an amine-modified colloidal silica. The reaction mixture was allowed to cool to room temperature, and 5 parts by weight of vinyl acetic acid was added thereto with vigorous stirring to obtain a vinyl-modified colloidal silica.

[Preparative Example 3]

100 parts by weight of a colloidal silica (silica solid content: 30% by weight, average particle size: 7 nm) was charged into a three-neck flask equipped with a nitrogen inlet, a stirrer and a thermometer under nitrogen atmosphere, and then 50 parts by weight of N-[3-(trimethoxysilyl)propyl] polyethyleneimine hydrochloride (30% aqueous solution) was addedthereto with vigorous stirring at room temperature. Thereafter, the reaction mixture was raised to 60° C., and further reacted for 8 hours. The reaction mixture was allowed to cool to room temperature, and 5 parts by weight of acrylic acid was added thereto to obtain a vinyl-modified colloidal silica.

[Example 1]

350g of methylvinylpolysiloxane (vinyl-terminated polysiloxane, molecular weight: 780) and 70g of methylhydrogen polysiloxane (130 cSt) were charged into a reactor and mixed at 2,000 rpm using a homomixer. To the mixture was added 5 g of polyoxyethylenelauryl ether (9 mole), 5 g of polyoxyethylenelauryl ether (23 mole) and 100 g of water. Thereafter, the reaction mixture was stirred at 6,000 rpm. When viscosity started to increase, stirring rate was reduced to 2,000 rpm. 270g of water was added to the reaction mixture. The mixture was mixed using a high-pressure homomixer, and then diluted with 200g of distilled water to obtain an aqueous emulsion.

100 parts by weight of the aqueous emulsion was transferred into a reactor equipped with a stirring apparatus, and then diluted with 300 parts by weight of distilled water. 5 parts by weight of a water-dispersible solution containingchloroplatinate-olefin complex (solid content 20% by weight) and 10 parts by weight of the modified colloidal silica obtained in Preparative Example 1 were added to the dilution while stirring at room temperature. The mixture was stirred for 12 hours to obtain a homogeneous white silicone water-dispersible emulsion release liquid. The release liquid thus obtained was dried at a temperature of 105° C. for 3 hours. The content of non-volatile components in the release liquid was shown to be 12% by weight, and the average diameter of the particles in the release liquid was measured to be 0.1 μm using an electron microscope.

A biaxially stretched polyester film to be applied with the silicone resin was prepared in accordance with a conventional process. That is, after an unstretched film was extruded at 250° C.~300° C., the extruded film was stretched to 5 times in both transverse and longitudinal directions, respectively, at a temperature of 100° C. While the stretched film was passed through a coater, one or both sides of the film were applied with a release agent. The applied film was heat-set under wind speed of 20 m/s at a temperature of 200° C. for 20 seconds to produce a release film.

[Example 2]

A release film was produced in the same manner as in Example 1, except that 380 g of methylvinylpolysiloxane (vinyl-terminated polysiloxane, molecular weight: 780) and 40 g of methylhydrogenpolysiloxane (viscosity: 130cSt) were used.

[Example 3]

A release film was produced in the same manner as in Example 1, except that 400g of methylvinylpolysiloxane (vinyl-terminated polysiloxane, molecular weight: 780) and 20g of methylhydrogenpolysiloxane(viscosity:130 cSt) were used. The releasefilm thusproduced was dried at room temperature to obtain as an elastic white powder. The powder was confirmed by an electron microscope that it has a particle size of 1 µm as spherical particles.

[Example 4]

A release film was produced in the same manner as in Example 2, except that 575 parts by weight of distilled water was used.

[Example 5]

A release film was produced in the same manner as in Example 2, except that 200 parts by weight of distilled water was used.

[Example 6]

A release film was produced in the same manner as in Example 2, except that the vinyl-modified colloidal silica obtained in Preparative Example 2 was used.

[Example 7]

A release film was produced in the same manner as in Example 2, except that the vinyl-modified colloidal silica obtained in Preparative Example 3 was used.

[Example 8]

A release film was produced in the same manner as in Example 2, except that 10 parts by weight of the vinyl-modified colloidal silica obtained in Preparative Example 2 was used.

[Example 9]

A release film was produced in the same manner as in Example 2, except that 40 parts by weight of the vinyl-modified colloidal silica obtained in Preparative Example 1 was used.

[Comparative Example 1]

A release film was produced in the same manner as in Example 2, except that the vinyl-modified colloidal silica was not used.

[Comparative Example 2]

A release film was produced in the same manner as in Example 2, except that the vinyl-unmodified colloidal silica (silica solid content: 30% by weight, average particle size: 7 nm) was used.

[Comparative Example 3]

A release film was produced in the same manner as in Example 1, except that the modified colloidal silica was not used.

[Comparative Example 4]

A release film was produced in the same manner as in Example 3, except that the modified colloidal silica was not used.

Physical properties of the release films produced in Examples and Comparative Examples were measured. The results were shown in Table 1 below. The measurement of the physical properties was carried out in accordance with the following methods. The measurement of peel strength, percentage of residual adhesive and adhesive strength was carried out using Surface Property Tester (HEIDON 14DR). The conditions for the measurement were as follows:

peeling angle: –180°
peeling rate: 300 mm/min
sample size: 4 cm×15 cm
sample size for measuring peel strength (g/in): 100 mm The measurement was repeated five times, and the measured values were averaged.

1. Peel strength

Preparation of sample

1. A sample coated with silicone was maintained at 23° C. and 65% RH for 24 hours.
2. After a standard adhesive tape (TESA7475) was adhered to the surface of the silicone-coated sample, the sample was pressed under a load of 20g/cm² at 60° C. for 20 hours.
3. After the pressed sample was maintained at 23° C. and 65% RH for 3 hours, the physical properties of the sample were measured.

Instrument: Surface Property Tester (HELDON 14DR)

Method:
1. Peeling angle: 180°, Peeling rate: 300 mm/min.
2. Sample size: 400 mm×1500 mm, Sample size for measuring peel strength: 100 mm Data: The unit of peel strength is g/in. The measurement was repeated five times, and the measured values were averaged.

2. Percentage of residual adhesive

Preparation of sample

1. A sample coated with silicone was maintained at 23° C. and 65% RH for 24 hours.
2. After a standard adhesive tape (TESA7475) was adhered surface of the silicone-coated sample, the sample was pressed under a load of 20g/cm² at 60° C. for 20 hours.
3. After the pressed sample was maintained at 23° C. and 65% RH for 3 hours, the peel strength of the sample was measured.
4. The adhesive tape was removed and kept so as to leave no contaminants on the adhesive tape, and a cleanPET film was placed on the surf ace of the tape was pressed by one reciprocation using a tape roller having a weight of 2 kg (ASTM D- 1000-55T).
5. Measurement of peel strength Instrument: Surface Property Tester (HEIDOIN 14DR)

Method:
1. Peeling angle: 180°, Peeling rate: 300 mm/min.
2. Sample size: 400 mm×1500 mm, Sample size for measuring peel strength: 100 mm
3. Data $$\text{Percentage of residual adhesive} = \frac{\text{peel strength of adhesive tape after measuring release peel strength}}{\text{peel strength of new adhesive tape on PET film}} \times 100$$

3. Change in adhesive strength of sample

Preparation of sample:

1. A polyester film coated with silicone was aged in a Convection Oven (Heraeus, Model HC 4033) at 60° C. and 70% RH for 7 days.
2. After the aged film was maintained at 23° C. and 65% RH for 3 hours, a standard adhesive tape (TESA7475) was adhered to the surface of the silicone-coated sample to measure the peel strength of the sample.

Instrument: Surface Property Tester (HEIDON 14DR)

Method:
1. Peeling angle: 180°, Peeling rate: 300 mm/min.
2. Sample size:4 cm×15 cm, Sample size for measuring peel strength: 100

Data $$\text{Change in peel strength (\%)} = \frac{\text{peel strength before aging} - \text{peel strength after aging}}{\text{peel strength before aging}} \times 100$$

4. Solvent resistance

Preparation of sample:

1. A sample coated with silicone was maintained at room temperature (30° C.) for 3 hours.

2. The surface of the silicone-coated sample was reciprocately rubbed 10 times using cotton swabs containing methylethyl ketone and acetone, respectively, at constant pressure, and then physical properties of the sample were measured.

Method: The physical properties were identified using an electron microscope (Hitachi, Model S2000-150) under 300 power magnification.

Data: The physical properties of the sample were evaluated based on the following criteria.
1. ⊚(excellent): No erasing or peeling was observed.
2. ○(good): Slight erasing and peeling were observed.
3. ∆(average): Some erasing and peeling were observed.
4. x (poor): Distinct erasing and peeling were observed., As described in above Examples and Comparative Examples, since the release film according to the present invention uses the silicone aqueous emulsion release agent containing the vinyl-modified colloidal silica, no organic solvent is volatilized during producing the release film, and the release film is easily produced by in-line coating. The release film according to the present invention has greatly improved adhesive strength between a substrate and a release layer, and excellent peel strength between the release layer and an adherent.

Therefore, the release film according to the present invention can be used in various products such as adhesive labels, peel-off label stickers, double-sided tapes, etc.

TABLE 1

|  | Release liquid composition | | | | | | | Peel Strength | | Percentage of residual adhesive | Change in adhesion with substrate after | Solvent |
|  | (A) | (B) | (C) | (D) | (E) | (F) | (G) | (Average ± S.D.) | | (%) | aging (%) | Resistance |
|---|---|---|---|---|---|---|---|---|---|---|---|---|
| Exa. 1 | 35 | 7 | 3.18 | 0 | 1 | 3 | 375 | 5.2 ± 0.4 | 6.1 ± 0.7 | 89 | 11.0 | ⊚ |
| Exa. 2 | 38 | 4 | 3.18 | 0 | 1 | 3 | 375 | 5.3 ± 0.2 | 6.4 ± 0.4 | 95.3 | 9.5 | ⊚ |
| Exa. 3 | 40 | 2 | 3.18 | 0 | 1 | 3 | 375 | 7.1 ± 0.3 | 7.5 ± 0.5 | 88.2 | 18 | ○ |
| Exa. 4 | 38 | 4 | 3.18 | 0 | 1 | 3 | 375 | 5.4 ± 0.4 | 6.4 ± 0.4 | 93.8 | 22 | ⊚ |
| Exa. 5 | 38 | 4 | 3.18 | 0 | 1 | 3 | 275 | 6.1 ± 0.3 | 7.7 ± 0.5 | 92.4 | 33 | ⊚ |
| Exa. 6 | 38 | 4 | 4.0 | 0 | 1 | 3 | 373 | 5.3 ± 0.4 | 6.4 ± 0.5 | 94.7 | 23 | ⊚ |
| Exa. 7 | 38 | 4 | 2.91 | 0 | 1 | 3 | 375 | 6.5 ± 0.3 | 8.1 ± 0.5 | 93.2 | 35 | ⊚ |
| Exa. 8 | 38 | 4 | 1.59 | 0 | 1 | 3 | 368 | 7.3 ± 0.4 | 8.7 ± 0.7 | 88.0 | 25 | ○ |
| Exa. 9 | 38 | 4 | 6.36 | 0 | 1 | 3 | 388 | 8.9 ± 0.5 | 9.7 ± 0.8 | 90.3 | 15 | ⊚ |
| Comp. Exa. 1 | .8 | 4 | 0 | 0 | 1 | 1 | 361 | 7.1 ± 1.2 | 13.4 ± 1.9 | 83.5 | 92 | ∆ |
| Comp. Exa. 2 | 38 | 4 | 0 | 2.5 | 1 | 3 | 376 | 7.9 ± 1.7 | 18.7 ± 2.4 | 85.0 | 140 | X |
| Comp. Exa. 3 | 35 | 7 | 0 | 0 | 1 | 1 | 361 | 6.1 ± 1.4 | 17.5 ± 5.7 | 82.3 | 220 | ∆ |
| Comp. Exa. 4 | 40 | 2 | 0 | 0 | 1 | 1 | 361 | 7.1 ± 1.9 | 23.4 ± 6.3 | 81.3 | 270.5 | ∆ |

(A): Vinylpolysiloxane
(B): Hydropolysiloxane
(C): Vinyl-modified colloidal silica
(D): Unmodified colloidal silica
(E): Platinum chelate catalyst
(F): Surfactant
(G): Water

We claim:

1. A method of preparing a silicone aqueous emulsion release liquid comprising:

preparing a silicone aqueous emulsion release agent having 1–10% by weight of a dispersion of a vinyl-modified colloidal silica with a solids content of 10–40% by weight, 0.1–5% by weight of a dispersion of a platinum chelate catalyst with a solids content of 12–25% by weight, and a remaining amount of the silicone aqueous emulsion release agent being of a polysiloxane water-dispersible silicone emulsion with a solids content of 30–60% by weight; and dispersing the silicone aqueous emulsion release agent in water so as to have a solids content of 2.5–30% by weight, wherein the vinyl-modified collodial silica is obtained by reacting a colloidal silica with a vinylalkoxysilane selected from the group consisting of vinyltrimethoxysilane, vinyltriethoxysilane, allyltrimethoxysilane, allyltriethoxysilane, 3-(trimethoxysilyl)propyl acrylate, 3-(trimethoxysilyl)propyl methacrylate, 3-(triethoxysilyl)propyl acrylate, 3-(triethoxysilyl)propyl methacrylate, N-[3-(trimethoxsilyl)propyl]-N'-(4-vinylbenzyl) ethylenediaminehydrochloride.

2. A method of preparing a silicone aqueous emulsion release liquid comprising:

preparing a silicone aqueous emulsion release agent having 1–100% by weight of a dispersion of a vinyl-modified colloidal silica with a solids content of 10–40% by weight, 0.1–5% by weight of a dispersion of a platinum chelate catalyst with a solids content of 12–25% by weight, and a remaining amount of the silicone aqueous emulsion release agent being of a polysiloxane water-dispersible silicone emulsion with a solids content of 30–60% by weight; and dispersing the silicone aqueous emulsion release agent in water so as to have a solids content of 25–30% by weight, wherein the vinyl-modified colloidal silica is obtained by reacting a colloidal silica with an alkoxysilane having an amino group selected from the group consisting of γ-aminopropyltrimethoxysilane, γ-aminoproyltriethoxysilane, γ-aminopropylmethyldimethoxysilane, γ-aminopropyldimethylethoxysilane, N-phenyl-γ-aminopropyltrimethoxysilane, N-phenyl-γ-aminopropylthriethoxysilane, N-β-(aminoethyl)-γ- aminoproplytrimethoxysilane, (aminoethyl)-γ-aminopropyltriethoxysilane, N-β-(aminoethyl)-γ-aminopropylmethyldimethoxysilane, N-β-(aminoethyl)-γ-aminopropyldimethylethoxysilane, N'-[3-(trimethoxysilyl)propylldiethylenetriamine, N'-[4-(trimethoxysilyl)butyl]ethylenediamine and mixtures thereof, followed by further reacting with a carboxyl compound having a vinyl group selected from the group consisting of acrylic acid, methacrylic acid, itaconic acid, vinylacetic acid, vinylpropionic acid and mixtures thereof.

3. The method of claim 1, said platinum chelate catalyst being selected from the group consisting of carbon-supported platinum, silica-supported platinum, chloroplatinate, platinum-olefin complexes, platinum-alcohol complexes, platinum-amine complexes and platinum coordination compounds, said platinum chelate catalyst being water-dispersible.

4. The method of claim 2, said platinum chelate catalyst being selected from the group consisting of carbon-supported platinum, silica-supported platinum, chloroplatinate, platinum-olefin complexes, platinum-alcohol complexes, platinum-amine complexes and platinum coordination compounds, said platinum chelate catalyst being water-dispersible.

5. A release film comprising:

a polyester film; and a silicone aqueous emulsion release liquid applied on said polyester film as a release layer, said silicone aqueous emulsion release liquid comprising:

a silicone aqueous emulsion release agent having 1–10% by weight of a dispersion of a vinyl-modified colloidal silica with a solids content of 10–40% by weight, 0.1–5% by weight of a dispersion of a platinum chelate catalyst with a solids content of 12–25% by eight, and a remaining amount being of a polysiloxane water-dispersible silicone emulsion with a solids contend of 2.5–30% weight, said silicone aqueous emulsion release agent dispersed in water so as to have a solids content of 2.5–30% by weight, said vinyl-modified colloidal silica is obtqained by reacting a colloidal silica with a vinylalkoxysilane selected form the group consisting of vinyltrimethoxysilane, vinyltriethoxysilane, allythrimethoxysilane, allyltrimethoxysilane, 3-(trimethoxysilyl)propyl acrylate, 3-trimethoxysilyl)propyl methacrylate, 3-(triethoxysilyl)propyl acrylate, 3-(triethoxysilyl) propyl methacrylate, N-[3-(trimethoxysilyl)propyl]-N'-(4- vinylbenzyl)ethylenediaminehydrochloride.

6. A release film comprising:

a polyester film; and a silicone aqueous emulsion release liquid applied to said polyester film as a release layer, said silicone aqueous emulsion release liquid comprising:

a silicone aqueous emulsion release agent having 1–10% by weight of a dispersion of a vinyl-modified colloidal silica with a solids content of 10–40% by weight, 0.1–5% by weight of a dispersion of a platinum chelate catalyst with a solids content of 12–25% by weight, and a remaining amount of the silicone aqueous emulsion release agent being of a polysiloxane water-dispersible silicone emul sion with a solids content of 30–60% by weight, said silicone aqueous emulsion release agent in water so as to have a solids content of 25–30% by weight, said vinyl-modified colloidal silica being obtained by reacting a colloidal silica with an alkoxysilane having an amino group selected from the group consisting of γ-aminopropyldimethylethoxysilane, γ-aminoproyltriethoxysilane, γ-aminopropylmethyldimethoxysilane, γ-aminopropyldimethylethoxyilane, N-phenyl-γ-aminopropylthriethoxysilane, N-phenyl-γ-aminopropylthriethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropyldimethylethoxysilane, N'-[3-(trimethoxysilyl)propyldiethylenetriamine N'-[4-(trimethoxysilyl)butyl]ethylenediamine and mixtures thereof, followed by further reacting with a carboxyl compound having a vinyl group selected from the group consisting of acrylic acid, methacrylic acid, itaconic acid, vinylacetic acid, vinylpropionic acid and mixtures thereof.

* * * * *